(12) United States Patent
Lee (10) Patent No.: US 10,360,719 B2
(45) Date of Patent: Jul. 23, 2019

(54) METHOD AND APPARATUS FOR OBTAINING HIGH-QUALITY TEXTURES

(71) Applicant: Flux Planet, Inc., Seoul (KR)

(72) Inventor: Sang Yup Lee, Seoul (KR)

(73) Assignee: Flux Planet, Inc., Seoul (KR)

( * ) Notice: Subject to any disclaimer, the term of this patent is extended or adjusted under 35 U.S.C. 154(b) by 175 days.

(21) Appl. No.: 15/336,344

(22) Filed: Oct. 27, 2016

(65) Prior Publication Data

US 2018/0108135 A1 Apr. 19, 2018

(30) Foreign Application Priority Data

Oct. 19, 2016 (KR) .................. 10-2016-0135923

(51) Int. Cl.
*G06T 15/04* (2011.01)
*H04N 13/204* (2018.01)
(Continued)

(52) U.S. Cl.
CPC ........... *G06T 15/04* (2013.01); *H04N 13/204* (2018.05); *H04N 13/243* (2018.05); *H04N 13/254* (2018.05); *H04N 13/257* (2018.05); *H04N 13/282* (2018.05); *H04N 13/363* (2018.05); *G06T 2207/10012* (2013.01); *G06T 2207/10024* (2013.01)

(58) Field of Classification Search
CPC ........... G06T 15/04; G06T 2207/10024; G06T 2207/10012; H04N 13/257; H04N 13/204; H04N 13/363
USPC .......................................................... 348/47
See application file for complete search history.

(56) References Cited

U.S. PATENT DOCUMENTS

2004/0070677 A1* 4/2004 Adams, Jr. ............... H04N 1/58
  348/222.1
2010/0312143 A1* 12/2010 Kim ..................... A61B 5/0064
  600/587

(Continued)

FOREIGN PATENT DOCUMENTS

JP 2006-322906 A 11/2006
KR 10-0933466 B1 12/2009
(Continued)

*Primary Examiner* — Allen C Wong
(74) *Attorney, Agent, or Firm* — Novick, Kim & Lee, PLLC; Jae Youn Kim (57) ABSTRACT

Provided are a high-quality texture obtaining apparatus and a high-quality texture obtaining method. The high-quality texture obtaining apparatus includes a stereoscopic information obtainer configured to obtain a stereoscopic model of an object onto which patterns have been projected and a first texture map including information about a texture and color of the object, from an image obtained by photographing the object; a virtual pattern projector configured to project virtual pattern light onto the stereoscopic model to project a virtual pattern onto the stereoscopic model; a texture map obtainer configured to extract a second texture map including information about a texture and a color of the stereoscopic model onto which the virtual pattern light has been projected; and a pattern remover configured to remove the patterns from the first texture map by referring to the second texture map and obtain a third texture map from which the patterns have been removed.

18 Claims, 6 Drawing Sheets

(51) Int. Cl.
*H04N 13/257* (2018.01)
*H04N 13/363* (2018.01)
*H04N 13/243* (2018.01)
*H04N 13/254* (2018.01)
*H04N 13/282* (2018.01)

(56) References Cited

U.S. PATENT DOCUMENTS

| | | | |
|---|---|---|---|
| 2011/0043609 A1 | 2/2011 | Choi et al. | |
| 2013/0321791 A1* | 12/2013 | Feldkhun | G01B 11/2518 356/4.01 |
| 2015/0062303 A1* | 3/2015 | Hanson | H04N 5/2252 348/47 |

FOREIGN PATENT DOCUMENTS

| | | |
|---|---|---|
| KR | 2011-0018696 A | 2/2011 |
| KR | 10-1639227 B1 | 7/2016 |

\* cited by examiner

METHOD AND APPARATUS FOR OBTAINING HIGH-QUALITY TEXTURES

CROSS-REFERENCE TO RELATED APPLICATION

This application claims the benefit of priority of Korean Patent Application No. 10-2016-0135923, filed on Oct. 19, 2016, in the Korean Intellectual Property Office, the disclosure of which is incorporated herein in its entirety by reference.

BACKGROUND

1. Field

One or more embodiments relate to a method and apparatus for obtaining high-quality textures.

2. Description of the Related Art

With developments in image processing technology, three-dimensional (3D) scanners that obtain a 3D image of an object from an image of the object are under development. 3D scanners provide a 3D image of an object to a user. Accordingly, the 3D image obtained by the 3D scanners provides the same effect as the user directly seeing the object.

For example, 3D scanners and 3D images are being utilized in the fields where users have difficulty in recognizing the shapes of objects due to the large sizes of the objects, such as, in the fields of construction and civil engineering. 3D scanners and 3D images are also being utilized in the fields where users have difficulty in recognizing the shapes of objects due to the structural features of the objects, such as, in the dentistry field. 3D scanners and 3D images are also being utilized to recognize objects in inaccessible areas, such as intense cold areas, intense heat areas, and contamination areas.

To obtain a stereoscopic model, which is a 3D image, of an object, depth information between a 3D scanner and the object is obtained. Accurate depth information (or distance information) is generally calculated by using a method of projecting structured pattern light. In this case, a photographing apparatus obtains an image of the object illuminated with the pattern light, and a pattern projected by the pattern light needs to be removed from the image of the illuminated object.

To remove the pattern, a photographing apparatus having an optical axis that coincides with that of a pattern projecting apparatus that projects the pattern should be included, information about the brightness and area of the pattern projected by the pattern light should be calculated for each pixel corresponding to the projected pattern, and the pattern may be removed for each pixel according to a result of the calculation.

Also, when a pattern projection apparatus that projects an infrared-based pattern undetectable by a photographing apparatus is used, equipment for making a photographing apparatus for sensing infrared light and a photographing apparatus for photographing visible light have the same optical axes is additionally required, and information about an image captured by an infrared camera is further included in the image of the object, leading to an increase in the data size of the image.

SUMMARY OF THE INVENTION

According to one or more embodiments, a high-quality texture obtaining apparatus includes a stereoscopic information obtainer configured to obtain a stereoscopic model of an object onto which patterns have been projected and a first texture map including information about a texture and color of the object, from an image obtained by photographing the object; a virtual pattern projector configured to project virtual pattern light onto the stereoscopic model to project a virtual pattern onto the stereoscopic model; a texture map obtainer configured to extract a second texture map including information about a texture and a color of the stereoscopic model onto which the virtual pattern light has been projected; and a pattern remover configured to remove the patterns from the first texture map by referring to the second texture map and obtain a third texture map from which the patterns have been removed.

According to one or more embodiments, a high-quality texture obtaining method includes obtaining a stereoscopic model of an object onto which patterns have been projected and a first texture map including information about a texture and color of the object, from an image obtained by photographing the object; projecting virtual pattern light onto the stereoscopic model to project a virtual pattern onto the stereoscopic model; extracting a second texture map including information about a texture and a color of the stereoscopic model onto which the virtual pattern light has been projected; and removing the patterns from the first texture map by referring to the second texture map and obtaining a third texture map from which the patterns have been removed.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

As the inventive concept allows for various changes and numerous embodiments, particular embodiments will be illustrated in the drawings and described in detail in the written description. The present invention will now be described more fully with reference to the accompanying drawings, in which exemplary embodiments of the invention are shown. However, this is not intended to limit the inventive concept to particular modes of practice, and it is to be appreciated that all changes, equivalents, and substitutes that do not depart from the spirit and technical scope are encompassed in the inventive concept. While such terms as "first," "second," etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that the terms such as "including," "having," and "comprising" are intended to indicate the existence of the features or components disclosed in the specification, and are not intended to preclude the possibility that one or more other features or components may be added. Sizes of components in the drawings may be exaggerated for convenience of explanation. In other words, since sizes and thicknesses of components in the drawings are arbitrarily illustrated for convenience of explanation, the following embodiments are not limited thereto.

Figure 1:
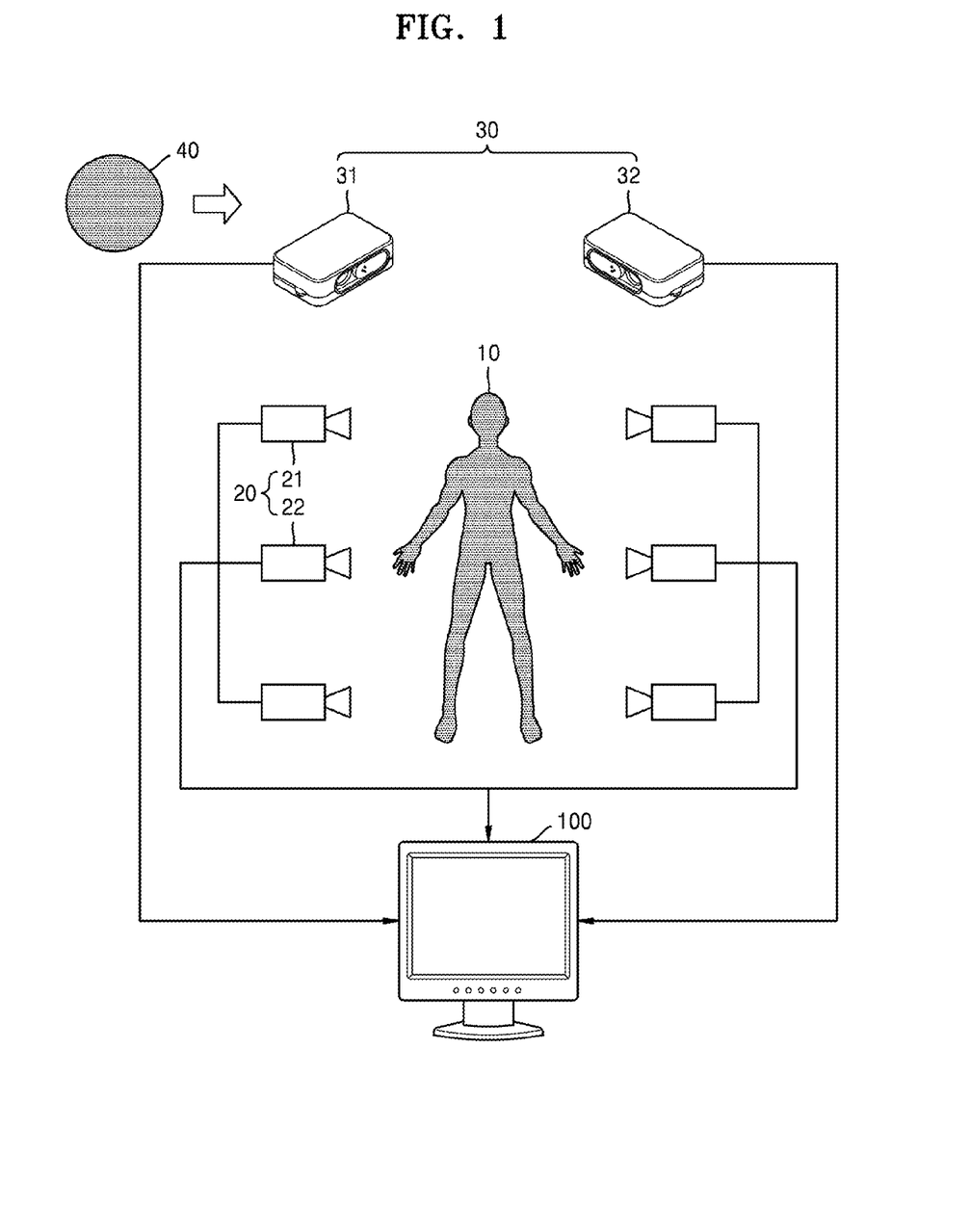
FIG. 1 is a schematic diagram of a texture obtaining system according to an embodiment.

FIG. 1 is a schematic diagram of a texture obtaining system 10 according to an embodiment.

Referring to FIG. 1, the texture obtaining system 10 includes a high-quality texture obtaining apparatus 100, at least one camera 21 and 22, and at least one projector, namely, projectors 31 and 33. The texture obtaining system 10 may obtain stereoscopic information about an object which is to be photographed, and texture information about a texture, a color, and the like of the object, by using captured images of multiples views.

A photographing apparatus 20 is disposed such that its optical axis faces an object 50, and photographs the object 50. The photographing apparatus 20 may include a plurality of cameras 21 and 22 having different optical axes. The plurality of cameras 21 and 22 may be arranged to surround the object 50 such that angles between virtual lines that connect the object 50 with the cameras 21 and 22 are kept constant. In this case, the plurality of cameras 21 and 22 may be equally spaced apart from one another, and may photograph a uniform size area of the object 50 in their respective directions. In other words, the photographing apparatus 20 may generate image information obtained by photographing the object 50 at a plurality of views via the plurality of cameras 21 and 22. Photographing time points of the plurality of cameras 21 and 22 may be synchronized with one another, and thus the plurality of cameras 21 and 22 may photograph the object 50 simultaneously.

A pattern projection apparatus 30 may project pattern light having a specific pattern image to a surface of the object 50. At least one pattern having the pattern image is projected to the object 50 due to the pattern light projected by the pattern projection apparatus 30. The pattern projection apparatus 30 may project the pattern onto the object 50 and thus may obtain information used to measure a distance from the object 50. The pattern projecting apparatus 30 may include a plurality of projectors 31 and 33 having different optical axes. Although two projectors 31 and 33 are illustrated in FIG. 1, at least three projectors may be included to project pattern light onto the object 50 in all directions of the object 50, and the number of projectors is not limited. The number of projectors 31 and 33 does not need to be equal to that of cameras 21 and 22, and may be less than that of cameras 21 and 22. For example, the pattern projection apparatus 30 may be disposed on front, rear, left, and right sides of the object 50.

Although the pattern lights of the pattern projection apparatus 30 are illustrated as a plurality of circular light sources 40 positioned at lattice points of an equidistant lattice in FIG. 1, the pattern lights may have various shapes, such as a polygon, a semi-circle, and an oval, and may be arranged at various intervals, and the inventive concept is not limited the shapes of the pattern lights and the intervals between the pattern lights. For convenience of explanation, it is assumed that each pattern light has a circular shape and pattern lights are equidistant from one another.

The high-quality texture obtaining apparatus 100 may obtain, from the photographing apparatus 20 and the pattern projection apparatus 30, external parameter information, such as the directions of the optical axes, the respective coordinates of the pattern projection apparatus 30 and photographing apparatus 20, and internal parameter information, such as the principal points, focal distances, and asymmetry coefficients, or external parameter information, such as the respective coordinates of the pattern projection apparatus 30 and photographing apparatus 20.

The pattern light projected by the pattern projection apparatus 30 is a sort of visible light, and a first texture map, which is a texture map that is applied to the stereoscopic model, includes information about a color of the object that has been changed in brightness by the pattern light. In this case, the information about the color changed by the pattern light needs to be removed in order to obtain accurate texture information of the object 50. As a method of removing the pattern, there is a method of removing a pattern by making the optical axes of the projectors 31 and 33 coincide with those of the cameras 21 and 22 by using a half mirror and then calculating brightness due to the pattern for each pixel of the image based on pre-modelled pattern information. In this case, special equipment needs to be further included to make the optical axes of the projectors 31 and 33 coincide with those of the cameras 21 and 22, and the number of projectors 31 and 33 needs to be equal to that of cameras 21 and 22.

In contrast with this method, the high-quality texture obtaining apparatus 100 according to an embodiment may obtain a stereoscopic model having a virtual pattern corresponding to the pattern physically projected onto the object 50 by using virtual projectors included in a virtual pattern projection apparatus, and may delete pattern information from the first texture map by referring to a second texture map obtained from the stereoscopic model having the virtual pattern. In this case, even when the cameras 21 and 22 and the projectors 31 and 33 do not have the same optical axes, pattern information may be accurately removed. This will be described in detail later with reference to the accompanying drawings.

A texture is 2D image information of a stereoscopic model obtained from the image obtained by photographing the object 50. The texture includes information about a detailed shape, a color, and a texture of the stereoscopic model. A texture map includes coordinate information about which spot on the coordinate of the stereoscopic model the pieces of information about the color and the texture are applied to. Texture mapping is used to apply texture information to a coordinate pixel on the stereoscopic model corresponding to the coordinate information of the texture map. The stereoscopic model is added to the information about a detailed shape, a color, and a texture via the texture mapping. In other words, the first texture map is obtained by extracting texture information of the stereoscopic model based on the image information, and the first texture map includes color and texture information of an object.

A texture map obtained from an image of the pattern-projected object 50 includes unnecessary texture information about a pattern, and the unnecessary texture information about the pattern needs to be removed in order to obtain an accurate stereoscopic image of the object 50. An apparatus and method regarding this operation will now be described in detail.

Figure 2:
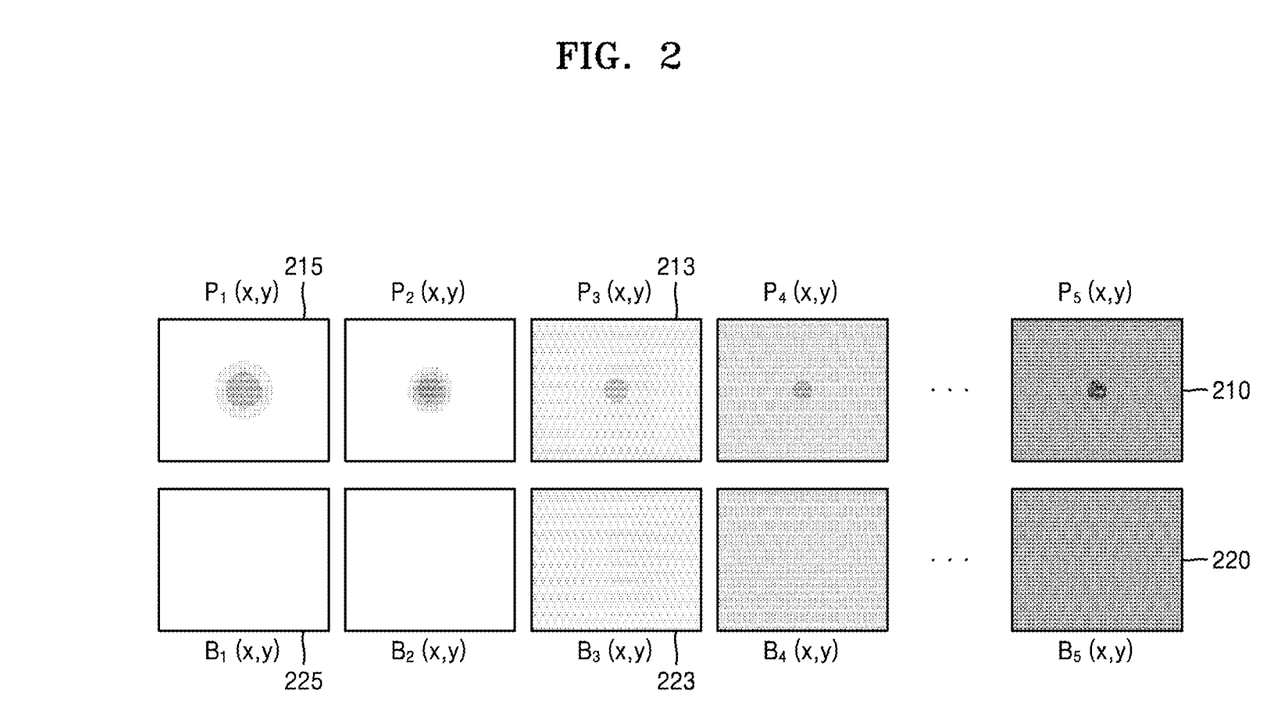
FIG. 2 is a view for explaining a method of collecting pattern information about the brightnesses and shapes of patterns according to distance information between an object and a photographing apparatus that photographs the object, according to an embodiment.

FIG. 2 is a view for explaining a method of collecting pattern information about the brightnesses and shapes of patterns according to distance information between an object and a photographing apparatus that photographs the object, according to an embodiment.

Referring to FIG. 2, the high-quality texture obtaining apparatus 100 may generate stereoscopic information and a stereoscopic model of an object included in the image, by referring to the image information.

Before removing a pattern from the first texture map, the high-quality texture obtaining apparatus 100 may collect pieces of information about the brightnesses and shapes of the pattern according to distances from the stereoscopic model. For example, when the object 50 is photographed by the photographing apparatus 20 having the same optical axis as the pattern projection apparatus 30, a pattern projected onto the object 50 becomes darker as a distance between the photographing apparatus 20 and the object 50 increases, and the shape and radius of the pattern change away from the focus of the photographing apparatus 20. By taking into account this point, the high-quality texture obtaining apparatus 100 previously stores a database (DB) 150 (see FIG. 3) including the pieces of pattern information according to distances between the photographing apparatus 20 and the object 50, in a storage 160 (see FIG. 3). In other words, the high-quality texture obtaining apparatus 100 may collect pieces of information about a pattern projected onto the object 50 by changing the location of the object 50 every time to change the distance between the projectors 31 and 33 and the object 50.

According to an embodiment, the high-quality texture obtaining apparatus 100 may obtain the pieces of pattern information even when there are no photographing apparatuses having the same optical axes as the pattern projection apparatus 30. The high-quality texture obtaining apparatus 100 collects the pieces of pattern information by using a pattern projection apparatus 30 and a photographing apparatus 20 having different optical axes. The high-quality texture obtaining apparatus 100 may obtain brightnesses and shapes of patterns photographed by a virtual photographing apparatus (not shown) having the same optical axis as the pattern projection apparatus 30 by performing coordinate conversion on the brightnesses and shapes of patterns obtained by the photographing apparatus 20 having a different optical axis from the pattern projection apparatus 30.

According to an embodiment, as shown in FIG. 2, the photographing apparatus 20 may capture first through fifth pattern images 210 through 215. The first through fifth pattern images 210 through 215 are images of a pattern projected onto a sample object, serving as a sample, which are captured when the object and the photographing apparatus 20 gradually distance from each other. Brightness of the first pattern image 210, which is captured when the object and the photographing apparatus 20 are relatively close to each other, is higher than brightness of each of the second through fifth pattern images 211 through 215. The radius of a pattern sequentially increases from the first pattern image 210 to the fifth pattern image 215, because, if the object is goes out of focus of the camera, light blurring occurs. The high-quality texture obtaining apparatus 100 may collect, as the DB 150, pieces of pattern information about the brightnesses and shapes of the pattern respectively corresponding to the distances. The high-quality texture obtaining apparatus 100 may obtain, from the DB 150, an adequate shape and an adequate brightness of a virtual pattern when virtual pattern light is projected onto the stereoscopic model.

In the first pattern image 210 and a first background image 220, spots other than a pattern-projected spot have the same brightness and the same color. In other words, the high-quality texture obtaining apparatus 100 may estimate a pattern-located area within the first pattern image 210 and a brightness variation due to the pattern by referring to the first background image 220. In this regard, the high-quality texture obtaining apparatus 100 may compare the first pattern image 210 with the first background image 220 to collect information about a difference between brightness (hereinafter, first brightness) of the object 50 when the pattern has not been projected and brightness (hereinafter, second brightness) of the object 50 when the pattern has been projected. The high-quality texture obtaining apparatus 100 may previously collect the information about the difference between the first brightness and the second brightness, namely, the brightness variation due to the pattern, and may establish a DB by defining the brightness variation due to the pattern as brightness of the pattern. For example, when the first brightness of a pattern-projected area within the first pattern image 210 has an RGB (100, 50, 130) and the second brightness of the first background image 220 has an RGB (110, 70, 140), the brightness of the pattern, which is the brightness variation due to the pattern, is calculated to be RGB (10, 20, 10) and stored in storage 160.

Brightness of a pixel on the image information having a normal vector in the same direction as the pattern light and brightness of pixels on the image information located adjacent to the pixel, may be changed by the pattern light due to scattering or the like of the pattern light. By taking into account this point, the high-quality texture obtaining apparatus 100 also collects pieces of pattern information about brightness and a shape (or radius) of the pattern.

The high-quality texture obtaining apparatus 100 may also collect pattern information including brightness information of peripheral pixels (hereinafter, second pixels) around a pixel onto which the pattern has been projected (hereinafter, a first pixel). For example, the high-quality texture obtaining apparatus 100 may compare normal vectors and illumination directions of the pixels on the image with each other to calculate brightness information of the second pixels, and previously store the calculated brightness information.

According to an embodiment, pattern lights projected by at least two projectors 31 and 33 may overlap with each other on the object 50. Since several projectors 31 and 33 are arranged and project pattern lights to the object 50, patterns may be overlapped with each other on a portion of the object 50. In this case, an overlapped pattern is brighter than a non-overlapped pattern, and the shape of the pattern varies. The high-quality texture obtaining apparatus 100 may collect pieces of pattern information by taking into account the brightness and shape of the pattern according to overlapping. The brightness of the pattern may be corrected in consideration of reflectivity, diffused reflectivity, and the like according to the texture of the object 50.

Figure 3:
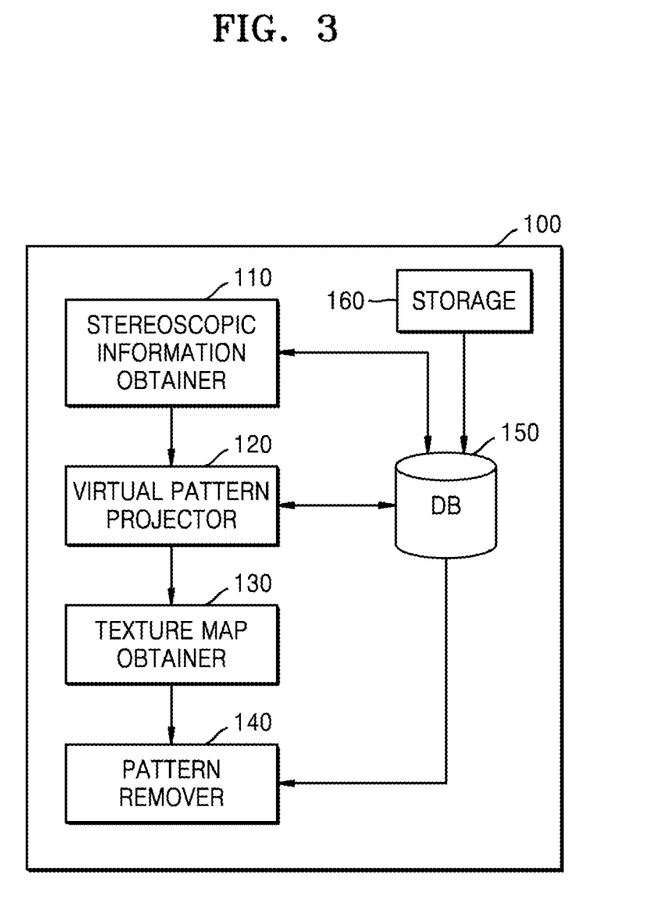
FIG. 3 is a block diagram of an internal structure of the high-quality texture obtaining apparatus of FIG. 1, according to an embodiment of the present invention.

FIG. 3 is a block diagram of an internal structure of the high-quality texture obtaining apparatus 100 of FIG. 1, according to an embodiment of the present invention.

Referring to FIG. 3, the high-quality texture obtaining apparatus 100 includes a processor (not shown), a program storage (not shown), the DB 150, a stereoscopic information obtainer 110, a virtual pattern projector 120, a texture map obtainer 130, a pattern remover 140, and a storage 160 storing the DB 150.

The processor may be any device capable of processing data. The processor used herein may refer to a data processing device built in hardware, the data processing device including a physically structured circuit to perform a function expressed by a code or a command included in a program. Examples of the data processing device built in hardware include, but are not limited to, a microprocessor, a central processing unit (CPU), a processor core, a multiprocessor, an application specific integrated circuit (ASIC), a field programmable gate array (FPGA), and a graphics processing unit (GPU).

The storage 160 stores the DB 150 including stereoscopic information, such as distance information calculated via the image information, and pieces of pattern information according to distances from an object which is to be photographed, as described above with reference to FIG. 2. The storage 160 stores stereoscopic information, such as distance information indicating a distance from the object 50 previously calculated based on the image information by the processor, and information about the stereoscopic model of the object 50 pre-modelled based on the stereoscopic information, and stores internal parameter information (e.g., principal points, focal distances, and asymmetry coefficients of the photographing apparatus 20 and the pattern projection apparatus 30) and external parameter information (e.g., optical axes and spatial location information of the pattern projection apparatus 30 and the photographing apparatus 20) obtained from the pattern projection apparatus 30 and the photographing apparatus 20. The storage 160 may be stored in magnetic storage media or flash storage media, but the inventive concept is not limited thereto.

The program storage may include control software capable of performing an operation of obtaining stereoscopic information, such as distance information, from pattern information indicating a pattern projected onto the image, an operation of obtaining a stereoscopic model based on the image information, an operation of extracting a texture map of the stereoscopic model, an operation of performing texture mapping on the stereoscopic model, and an operation of generating a series of polygons by using stereoscopic information and obtaining a texture coordinate by using the image information. In detail, the program storage may include control software capable of performing an operation of generating an image including stereoscopic information of the object 50 by extracting data of the object 50 from images obtained by using the processor and by performing a reconstructing process with respect to the extracted data of the object 50.

For example, the processor may generate polygons having information about a stereoscopic shape of an object based on information about the parameter information and stereoscopic information, which is the distance information from the image information, according to the control software included in the program storage. The processor may extract a texture map, which is a 2D image with respect to a color, a texture, and the like applied to the surfaces of the polygons, based on the image information. Thereafter, the processor may generate a stereoscopic model corresponding to the stereoscopic shape of the object 50 by combining the polygons with one another. The generated stereoscopic model may be reconstructed to be similar to an actual object, by applying the texture map to the polygons.

The DB 150 includes pieces of pre-collected pattern information about brightnesses and shapes of a pattern corresponding to distances (hereinafter, distance information) between the camera 21 having the same optical axis as the pattern projection apparatus 20.

The stereoscopic information obtainer 110 obtains the stereoscopic model, the distance information, and the first texture map from the storage 160. The stereoscopic model obtained by the stereoscopic information obtainer 110 is a stereoscopic image which is a combination of polygons to which a color or a texture has not been applied. The first texture map includes image information about a color and a texture applied to the stereoscopic model. The first texture map includes information about the coordinates of the pixels of the stereoscopic model. In other words, the first texture map includes coordinate information and color information of each pixel on the stereoscopic model. The stereoscopic information obtainer 110 may extract the first texture map including color and texture information that is applied to the stereoscopic model, based on the image information. The pre-modelled stereoscopic model is included in the distance information obtained via the image information of the object 50 obtained by the photographing apparatus 20. Thus, the stereoscopic information obtainer 110 may obtain the distance information corresponding to each pixel on the image.

The virtual pattern projector 120 obtains pre-set internal and external parameter information of the pattern projection apparatus 30 from the storage 160. The virtual pattern projector 120 may generate a virtual pattern projection apparatus having internal and external parameter information corresponding to the pre-set internal and external parameter information. The virtual pattern projector 120 may arrange the generated virtual pattern projection apparatus and a stereoscopic model at a location corresponding to the stereoscopic information within a virtual space. In order to include only texture information about the virtual pattern on the stereoscopic model, the virtual pattern projector 120 sets the virtual space as a darkroom having not light so that only the virtual pattern projected by the virtual pattern light has brightness on the stereoscopic model.

The virtual pattern projector 120 projects virtual pattern light onto the stereoscopic model by using the virtual pattern projection apparatus disposed within the virtual space, and thus locates virtual patterns at image coordinates on the stereoscopic model corresponding to image coordinates at which patterns disposed on the image are located. In detail, since the virtual pattern projection apparatus has internal and external parameters corresponding to the actual pattern projection apparatus 30, which projects a pattern onto the object 50, a plurality of virtual patterns are projected onto locations on the stereoscopic model that match with locations on the object 50 onto which patterns are projected by the actual pattern projection apparatus 30. This may be implemented via an illumination simulation program previously stored in the program storage. In other words, the virtual pattern projector 120 may perform an illumination simulation so that the virtual patterns are arranged on the stereoscopic model to have the same pattern as that of the patterns projected onto the image. In other words, the virtual pattern projector 120 may locate the virtual patterns at spots on the stereoscopic model that match with the spots on the image at which the patterns are arranged.

According to an embodiment, the virtual pattern projector 120 may determine the brightnesses and shapes of the virtual patterns by referring to the pieces of pattern information described above with reference to FIG. 2. The patterns arranged on the image are projected while having different pattern information according to distances between the object 50 and a photographing apparatus. By taking into account this point, the virtual pattern projector 120 may determine brightnesses and shapes of the virtual patterns via the DB 150 in which how pattern information varies according to the distance information is previously collected and stored. In other words, the virtual pattern projector 120 is able to project virtual patterns on the stereoscopic model to be different according to the distance information.

According to an embodiment, when the virtual pattern projector 120 projects a virtual pattern onto the stereoscopic model, the virtual pattern projector 120 may set the stereoscopic model to have an achromatic color. For example, the virtual pattern projector 120 may set the stereoscopic model to have a white color so that the virtual patterns are distinctly projected onto the stereoscopic model during an illumination simulation.

In other words, the virtual pattern projector 120 obtains distance information at spots on the stereoscopic model onto which the virtual patterns have been projected, via the stereoscopic information pre-stored in the storage 160. The virtual pattern projector 120 obtains and determines pattern information corresponding to the obtained distance information from the DB 150. The virtual pattern projector 120 projects the virtual patterns to have shapes and brightness corresponding to the determined pattern information. In other words, the virtual pattern projector 120 may arrange and project the virtual patterns to have the same pattern information as that of the patterns projected onto the image.

The virtual pattern projector 120 may correct the brightness of a pattern and the shape thereof, which are the pattern information, by referring to the inclination and material of the surface of the stereoscopic model. The virtual pattern projector 120 may project virtual patterns having the corrected pattern information onto the stereoscopic model to correct the virtual patterns to have the exactly same pattern information as pattern information of actual patterns.

The texture map obtainer 130 may extract a second texture map from the stereoscopic model onto which the virtual pattern projector 120 has projected the virtual patterns. Since the virtual patterns are arranged on spots on a stereoscopic model corresponding to the spots on the image at which the actual patterns are arranged, while having the same pattern information as that of the actual patterns, the second texture map includes coordinate information indicating the coordinates at which the virtual patterns are located, and information about the brightnesses of the virtual patterns. Brightness of pattern-located areas on the image, namely, not only a pixel having a normal vector in the same direction as the pattern light but also pixels located adjacent to the pixel, may be changed by the pattern light due to scattering or the like of the pattern light.

The first texture map is obtained by extracting texture information from the stereoscopic model by referring to the image information, and the second texture map is obtained from a stereoscopic model to which the first texture map has not been applied. The first texture map and the second texture map include texture information extracted from the same stereoscopic model, and have the same coordinate system. In other words, one pixel in the first texture map corresponds to a pixel in the second texture map that has the same coordinate information as the pixel in the first texture map.

According to an embodiment, the second texture map may not include texture information about coordinates on an image onto which no virtual patterns have been projected. As described above, only a pixel and its neighboring pixels on a stereoscopic model onto which virtual patterns have been projected have brightness due to virtual pattern light. In other words, only spots on the stereoscopic model onto which the virtual patterns have been projected have brightness of a predetermined value or higher, and the remaining spots have little brightness. Thus, the second texture map has brightness information for only a spot onto which the virtual patterns have been projected and peripheral pixels that are a certain distance away from the spot.

Since the brightness of the pattern has a value corresponding to a difference between brightness (first brightness) of the object 50 when no patterns have been projected and brightness (second brightness) of the object 50 when a pattern has been projected, texture information about the brightness included in the second texture map means a brightness variation due to pattern light.

The pattern remover 140 may remove the pattern from the first texture map by referring to the second texture map. In other words, the pattern remover 140 may detect information about the brightness variation due to the pattern light from the first texture map by referring to the second texture map, and may remove the information about the brightness variation from the first texture map.

According to an embodiment, the pattern remover 140 may remove the pattern by comparing the pixels (hereinafter, second pixels) of the second texture map and the first texture map. The pattern remover 140 may remove a brightness variation of a pixel due to pattern light. The pattern remover 140 may subtract the brightness of the second pixel from the brightness of the first pixel, which is a pixel of the first texture map. For example, when the brightness of the first pixel at a pattern-projected spot on the image within the first texture map is RGB (230, 210, 170) and the brightness of the second pixel within the second texture map corresponding to the first pixel is RGB (10, 30, 20), the pattern remover 140 may perform an arithmetic operation of subtracting the RGB value of the second pixel from the RGB value of the first pixel to thereby obtain a first pixel having brightness of RGB (220, 180, 150) from which the brightness variation due to the pattern has been removed. According to this method, the pattern remover 140 may generate a third texture map in which the brightness variation due to the pattern light has been removed from the remaining pixels included in the first texture map.

In this case, even when the pattern projection apparatus 30 and the photographing apparatus 20 do not have the same optical axis, the high-quality texture obtaining apparatus 100 may project the virtual patterns onto the stereoscopic model to thereby obtain a texture from which a pattern sensed by the photographing apparatus 20, such as visible light, has been removed.

Figure 4:
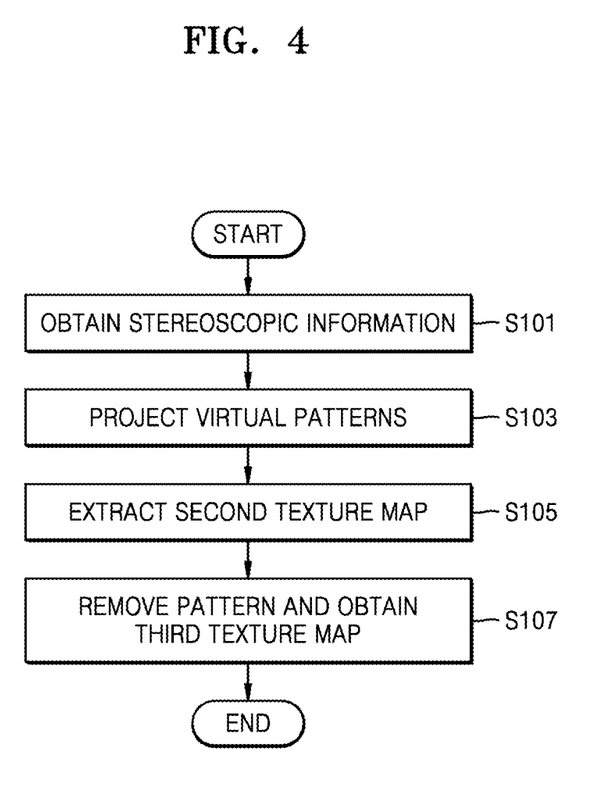
FIG. 4 is a flowchart of a method, performed by the high-quality texture obtaining apparatus of FIG. 1, of obtaining a third texture map from which patterns have been removed, according to an embodiment.

FIG. 4 is a flowchart of a method, performed by the high-quality texture obtaining apparatus 100, of obtaining a third texture map from which patterns have been removed, according to an embodiment.

Referring to FIG. 4, the high-quality texture obtaining apparatus 100 may obtain stereoscopic information (distance information) about the object 50, a stereoscopic model of the object 50, and a first texture map as texture information to be applied to the stereoscopic model, in operation S101.

The high-quality texture obtaining apparatus 100 may project virtual patterns by projecting virtual pattern light onto the obtained stereoscopic model via the virtual pattern projection apparatus having the same parameter information as the actual pattern projection apparatus 30. The high-quality texture obtaining apparatus 100 may arrange the virtual pattern projection apparatus and the stereoscopic model within a virtual space, and may project the virtual patterns onto pixels having the same coordinate values on the stereoscopic model as those of pattern-located pixels on the first texture map. The high-quality texture obtaining apparatus 100 may determine a brightness and a shape of a virtual pattern projected onto the stereoscopic model, based on the distance information and pattern information set according to the distance information, in operation S103.

The high-quality texture obtaining apparatus 100 extracts a second texture map from a stereoscopic model onto which the virtual pattern projection apparatus has projected virtual pattern light, in operation S105. As described above, a stereoscopic model onto which a virtual pattern has been projected has information about a color having brightness at only a spot onto which the virtual pattern has been projected. Accordingly, the extracted second texture map has coordinate information and pattern information of the virtual patterns.

The high-quality texture obtaining apparatus 100 may detect a brightness variation of the object 50 due to pattern light from the first texture map by referring to the second texture map. The high-quality texture obtaining apparatus 100 may remove the detected brightness variation from the first texture map and acquire a third texture map from which the brightness variation due to the pattern light has been removed (namely, texture distortion due to the pattern light has been removed), in operation S107. Since brightness values of the virtual patterns are set as brightness variation values according to projection or non-projection of patterns within the second texture map, the third texture map has texture information of the object 50 from which patterns have been removed, via a removal of brightness variations according to projection or non-projection of patterns.

Figure 5:
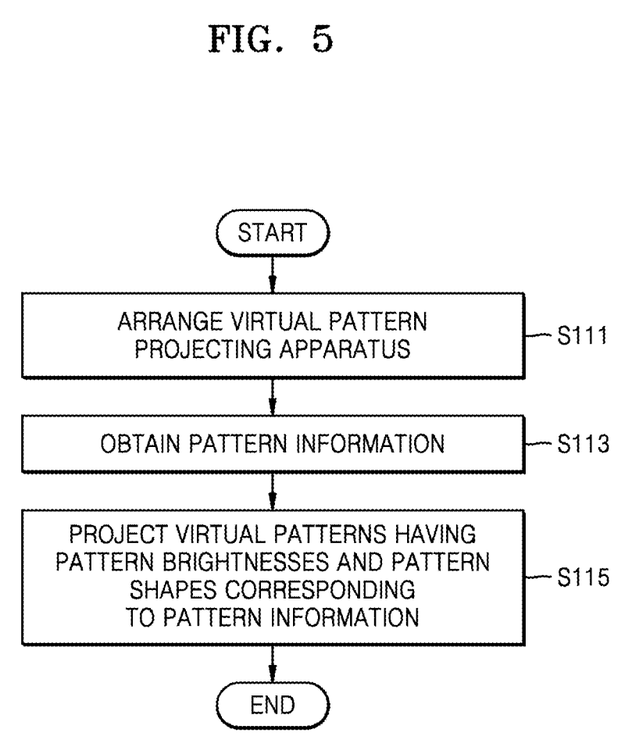
FIG. 5 is a flowchart of a method, performed by the high-quality texture obtaining apparatus of FIG. 1, of projecting a virtual pattern onto a stereoscopic model, according to an embodiment.

FIG. 5 is a flowchart of a method, performed by the high-quality texture obtaining apparatus 100, of projecting a virtual pattern onto a stereoscopic model, according to an embodiment.

Referring to FIG. 5, the high-quality texture obtaining apparatus 100 arranges a virtual pattern projecting apparatus having information corresponding to internal and external parameter information of the pattern projection apparatus 30, within a virtual space. The high-quality texture obtaining apparatus 100 arranges a stereoscopic model having distance information corresponding to the distance information indicating a distance from the object 50 described above with reference to FIG. 2 within the virtual space, based on a relationship between the locations of the object 50 and the pattern projection apparatus 20, in operation S111.

Next, the high-quality texture obtaining apparatus 100 may detect a projected spot on the stereoscopic model, onto which a virtual pattern is to be projected, and obtain distance information of the projected spot from pre-stored stereoscopic information. After the distance information is obtained, the high-quality texture obtaining apparatus 100 may obtain pattern information about the brightness and shape of the virtual pattern from the DB 150, based on the obtained distance information, in operation S113.

The high-quality texture obtaining apparatus 100 may include a process of pre-collecting various pieces of information about a pattern projected onto a sample object according to distance information indicating distances from the sample object while changing the location of the sample object, in a pre-processing process for removing a pattern.

Next, the high-quality texture obtaining apparatus 100 projects virtual patterns having pattern brightnesses and pattern shapes corresponding to the pattern information of patterns arranged on the image, in operation S115.

Figure 6:
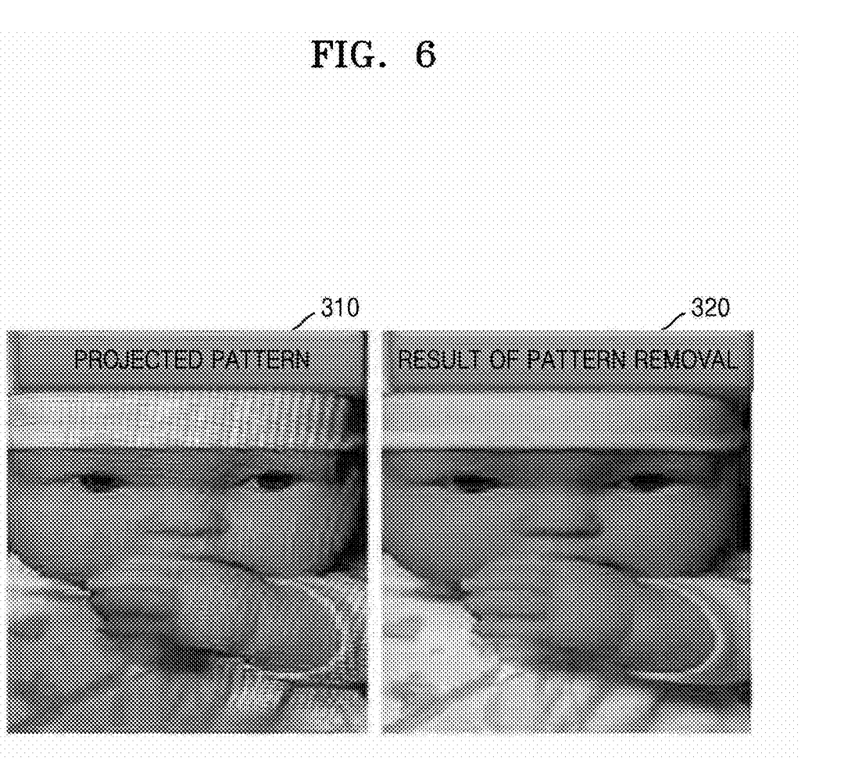
FIG. 6 illustrates pictures for explaining a result of a pattern removal performed by the high-quality texture obtaining apparatus of FIG. 1, according to an embodiment.

FIG. 6 illustrates pictures for explaining a result of a pattern removal performed by the high-quality texture obtaining apparatus 100, according to an embodiment.

Referring to FIG. 6, a first image 310, which is an image of the object 50 onto which a pattern has been projected, includes the projected pattern. Image distortion of the object 50 due to the pattern has been removed from a second image 320, which is obtained by performing texture mapping on the stereoscopic model according to the third texture map from which the pattern has been removed, and thus an image including significantly-accurate stereoscopic information of the object 50 may be obtained.

The above-described embodiment may be implemented in the form of a computer program executable via various elements on a computer. Such a computer program may be recorded on a computer-readable medium. Examples of the computer-readable medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a hardware device specially configured to store and execute program commands (e.g., a ROM, random-access memory (RAM), or a flash memory).

Examples of the computer-readable recording medium may further include an intangible medium that is implemented to be transmittable over a network. For example, the computer-readable recording medium may be a medium that is implemented as software or an application and is transmittable and distributable over the network.

The computer program may be specially designed and configured for embodiments or may be well-known to and be usable by one of ordinary skill in the art of computer software. Examples of the computer program include advanced language codes that can be executed by a computer by using an interpreter or the like as well as machine language codes made by a compiler.

The particular implementations shown and described herein are illustrative embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

Therefore, the scope of the present invention is defined not by the detailed description but by the appended claims, and all differences within the scope will be construed as being included in the present invention.

What is claimed is:

1. A high-quality texture obtaining apparatus comprising:
 a stereoscopic information obtainer configured to generate a virtual stereoscopic model of an object, and obtain a first texture map of the object, including information about a texture and a color of the object, from an image obtained by photographing the object onto which physical pattern light has been projected to form a physical pattern on the object;

a virtual pattern projector configured to project virtual pattern light onto the virtual stereoscopic model to form a virtual pattern on the virtual stereoscopic model;

a virtual texture map obtainer configured to extract a second texture map of the virtual stereoscopic model including information about a texture and a color of the virtual stereoscopic model onto which the virtual pattern light has been projected; and a pattern remover configured to remove the physical pattern on the object from the first texture map by referring to the second texture map having the virtual pattern on the virtual stereoscopic model and obtain a third texture map in which the physical pattern has been removed.

2. The high-quality texture obtaining apparatus of claim 1, wherein the physical pattern is formed by visible light-based pattern light projected by a plurality of projectors.

3. The high-quality texture obtaining apparatus of claim 2, further comprising a storage configured to store a database (DB) including pieces of pattern information about a brightness and shape of a pattern according to distances between the object and a photographing apparatus that photographs the object, and stereoscopic information including distance information of the object.

4. The high-quality texture obtaining apparatus of claim 3, wherein the brightness of the pattern comprises a difference between brightness of a predetermined spot on the object when no patterns have been projected onto the predetermined spot and brightness of the predetermined spot on the object when a pattern has been projected onto the predetermined spot.

5. The high-quality texture obtaining apparatus of claim 4, wherein the virtual texture map obtainer is configured to extract the second texture map from the virtual stereoscopic model onto which the virtual pattern light has been projected, based on the pattern information.

6. The high-quality texture obtaining apparatus of claim 3, wherein the virtual pattern projector is configured to generate a plurality of virtual projectors having parameter information corresponding to parameter information of the plurality of projectors, and
wherein the parameter information of the plurality of projectors includes internal parameters, having one or more of principal points, focal distances, and asymmetry coefficients of the plurality of projectors, and external parameters, having one or more of optical axes and location information of the plurality of projectors.

7. The high-quality texture obtaining apparatus of claim 6, wherein the virtual pattern projector is configured to project the virtual pattern light onto the virtual stereoscopic model via the plurality of virtual projectors.

8. The high-quality texture obtaining apparatus of claim 6, wherein the virtual pattern projector is configured to obtain the pieces of pattern information corresponding to the distance information and to project virtual patterns having the obtained pieces of pattern information onto the virtual stereoscopic model.

9. A high-quality texture obtaining method comprising:
generating a virtual stereoscopic model of an object, and
obtaining a first texture map of the object, including information about a texture and a color of the object, from an image obtained by photographing the object onto which physical pattern light has been projected to form a physical pattern on the object;

projecting virtual pattern light onto the virtual stereoscopic model to form a virtual pattern on the virtual stereoscopic model;

extracting a second texture map of the virtual stereoscopic model including information about a texture and a color of the virtual stereoscopic model onto which the virtual pattern light has been projected; and removing the physical pattern on the object from the first texture map by referring to the second texture map having the virtual pattern on the virtual stereoscopic model and obtaining a third texture map in which the physical pattern has been removed.

10. The high-quality texture obtaining method of claim 9, further comprising collecting pieces of pattern information, which are pieces of information about a brightness and shape of a pattern according to distances between the object and a photographing apparatus that photographs the object.

11. The high-quality texture obtaining method of claim 10, wherein the brightness of the pattern comprises a difference between brightness of a predetermined spot on the object when no patterns have been projected onto the predetermined spot and brightness of the predetermined spot on the object when a pattern has been projected onto the predetermined spot.

12. A non-transitory computer-readable recording medium having recorded thereon a program for executing the method of claim 11.

13. The high-quality texture obtaining method of claim 10, wherein the physical pattern is formed by visible light-based pattern light projected by a plurality of projectors.

14. The high-quality texture obtaining method of claim 13, wherein the projecting of the virtual pattern onto the virtual stereoscopic model comprises generating a plurality of virtual projectors having parameter information corresponding to parameter information of the plurality of projectors, and
wherein the parameter information of the plurality of projectors includes internal parameters, having one or more of principal points, focal distances, and asymmetry coefficients of the plurality of projectors, and external parameters, having one or more of optical axes and location information of the plurality of projectors.

15. The high-quality texture obtaining method of claim 14, wherein the projecting of the virtual pattern onto the virtual stereoscopic model comprises projecting the virtual pattern light onto the virtual stereoscopic model via the plurality of virtual projectors.

16. A non-transitory computer-readable recording medium having recorded thereon a program for executing the method of claim 13.

17. A non-transitory computer-readable recording medium having recorded thereon a program for executing the method of claim 10.

18. A non-transitory computer-readable recording medium having recorded thereon a program for executing the method of claim 9.

* * * * *